United States Patent
Hamborg et al.

(10) Patent No.: US 9,619,338 B2
(45) Date of Patent: Apr. 11, 2017

(54) FILE RECOVERY ON CLIENT SERVER SYSTEM

(71) Applicant: INTERNATIONAL BUSINESS MACHINES CORPORATION, Armonk, NY (US)

(72) Inventors: Felix Hamborg, Giessen (DE); Alexander Neef, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 14/492,823

(22) Filed: Sep. 22, 2014

(65) Prior Publication Data

US 2015/0088831 A1    Mar. 26, 2015

(30) Foreign Application Priority Data

Sep. 24, 2013    (GB) .................................. 1316953.7

(51) Int. Cl.
*G06F 17/30*    (2006.01)
*G06F 11/14*    (2006.01)
(Continued)

(52) U.S. Cl.
CPC ...... *G06F 11/1464* (2013.01); *G06F 11/1451* (2013.01); *G06F 11/1469* (2013.01);
(Continued)

(58) Field of Classification Search
None
See application file for complete search history.

(56) References Cited

U.S. PATENT DOCUMENTS 8,055,862 B2    11/2011    Bender et al.
8,127,095 B1 *   2/2012    Colgrove ............ G06F 11/1435
                                                    711/117
(Continued)

FOREIGN PATENT DOCUMENTS

CN    102713856    10/2012

OTHER PUBLICATIONS

X. Zhang et. al, "Research on the Recovery Strategy of Incremental-Data-Based Continuous Data Protection", IEEE, 2012 International Conference on Computer Science and Electronics Engineering, 2012, vol. 3, pp. 498-502.
(Continued)

*Primary Examiner* — Son T Hoang
(74) *Attorney, Agent, or Firm* — Law Office of Jim Boice

(57) ABSTRACT

A method and/or computer program product recovers files that are generated by an application running on a client-server system that comprises a back-up client with a client back-up tool and a server with a server back-up tool. Application files are backed up on the server, and then restored to a back-up client based on file usage behavior of the application and their priority, and file stubs are created for remaining files. File usage behavior of the application performing data recovery and regular data processing after said restore process are monitored and analyzed, and files in different types of priority classes are classified based on file usage behavior. Existing file stubs at the back-up client are replaced with corresponding file content from the back-up server during runtime of the application based on predetermined criteria.

20 Claims, 5 Drawing Sheets

(51) Int. Cl.
*H04L 29/06* (2006.01)
*G06F 11/34* (2006.01)

(52) U.S. Cl.
CPC .. *G06F 17/30008* (2013.01); *G06F 17/30073* (2013.01); *H04L 67/42* (2013.01); *G06F 11/3409* (2013.01); *G06F 2201/865* (2013.01)

(56) References Cited

U.S. PATENT DOCUMENTS

| | | |
|---|---|---|
| 8,255,651 B2 | 8/2012 | Liu et al. |
| 8,375,005 B1 | 2/2013 | Claudatos et al. |
| 2004/0049513 A1 | 3/2004 | Yakir et al. |
| 2004/0088382 A1* | 5/2004 | Therrien ............ G06F 11/1448 709/219 |
| 2006/0143501 A1 | 6/2006 | Tormasov et al. |
| 2007/0294320 A1 | 12/2007 | Yueh et al. |
| 2010/0211822 A1 | 8/2010 | Colaíacomo et al. |
| 2011/0040729 A1* | 2/2011 | Ito ....................... G06F 3/0619 707/654 |
| 2011/0153561 A1 | 6/2011 | Sawdon et al. |
| 2012/0136831 A1* | 5/2012 | Wang .................. G06F 11/1469 707/640 |
| 2012/0151136 A1 | 6/2012 | Hay et al. |
| 2013/0054536 A1 | 2/2013 | Sengupta et al. |

OTHER PUBLICATIONS

M. Lu et. al, "Scalable Index Update for Block-Level Continuous Data Protection", IEEE, 6th IEEE International Conference on Networking, Architecture and Storage, 2011, pp. 372-381.

X. Zhang et. al, "Research on the Recovery Strategy of Incremental-Data-Based Continuous Data Protection", IEEE, 2012 International Conference on Computer Science and Electronics Engineering, 2012, vol. 3, pp. 498-502 (Abstract Only).

M. Lu et. al, "Scalable Index Update for Block-Level Continuous Data Protection", IEEE, 6th IEEE International Conference on Networking, Architecture and Storage, 2011, pp. 372 - 381 (Abstract Only).

* cited by examiner

FILE RECOVERY ON CLIENT SERVER SYSTEM

BACKGROUND

The present invention relates in general to the field of restore management in client server systems, and in particular to a method for file recovery and a corresponding client server system. Still more particularly, the present invention relates to a data processing program and a computer program product for request file recovery.

During a classic restore procedure an application requests files to be restored from a client backup tool. The client back-up tool restores all files from a server back-up tool. Once all files are restored the restore operation is completed and the application can recover into operational mode. So a recovery time objective depends on completion of the restore operation and the application is not allowed to recover until all files have been restored, wherein some files are needed first, some later, and others not at all.

Further in hierarchical storage management (HSM) stub files are used on machines, so that files that are needed are loaded from central repository on the fly causing a delay. This is only useful if few files are actually used. Also an expensive snapshot technology using a storage internal (virtual) backup and restore management is known.

SUMMARY

In one embodiment of the present invention, a method and/or computer program product recovers files that are generated by an application running on a client-server system that comprises a back-up client with a client back-up tool and a server with a server back-up tool. Application files are backed up on the server, and then restored to a back-up client based on file usage behavior of the application and their priority, and file stubs are created for remaining files. File usage behavior of the application performing data recovery and regular data processing after said restore process are monitored and analyzed, and files in different types of priority classes are classified based on file usage behavior. Existing file stubs at the back-up client are replaced with corresponding file content from the back-up server during runtime of the application based on predetermined criteria.

In one embodiment of the present invention, a client-server system comprises: a client, wherein the client comprises a client back-up tool; and a server, wherein the server comprises a server back-up tool performing file recovery, and wherein said files are generated by an application running on said client-server system; wherein said back-up client is backing up files of said application as back-up data in said back-up server; wherein said back-up server restores files of said back-up data at said back-up client based on file usage behavior of said application; wherein in case of missing file priority class information, said back-up server restores all files of said back-up data at said back-up client during a corresponding restore process; wherein in case of existing file priority class information, said back-up server restores files of a highest priority class at said back-up client and creates file stubs of all remaining files of said back-up data on said back-up client during a corresponding restore process; wherein said back-up server returns control to said application; wherein said back-up client and said back-up server monitor and analyze said file usage behavior of said application performing data recovery and regular data processing after a restore process; and wherein said back-up server classifies said files in different types of priority classes based on said file usage behavior, and replaces existing file stubs at said back-up client with corresponding file content during runtime of said application based on predetermined criteria.

BRIEF DESCRIPTION OF THE SEVERAL VIEWS OF THE DRAWINGS

A preferred embodiment of the present invention, as described in detail below, is shown in the drawings, in which.

DETAILED DESCRIPTION

Figure 1:
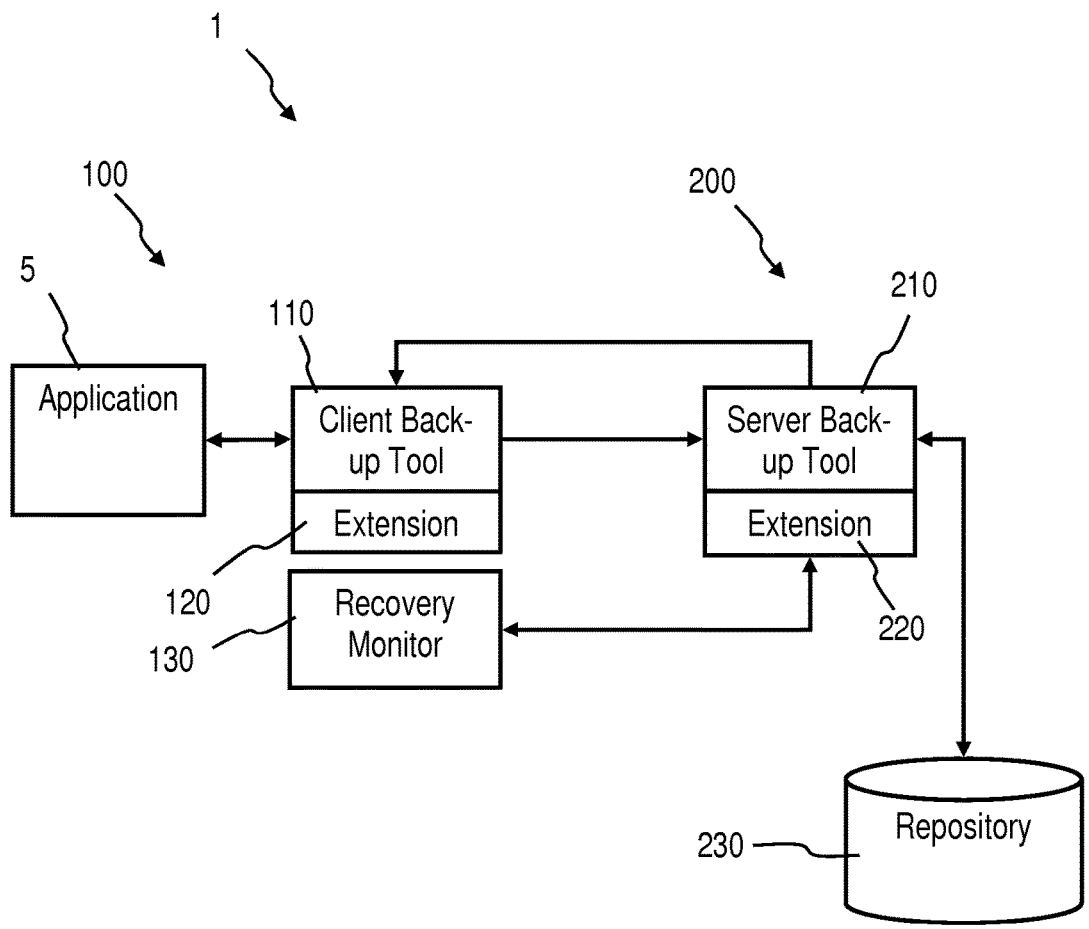
FIG. 1 is a block diagram of a client server system, in accordance with an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
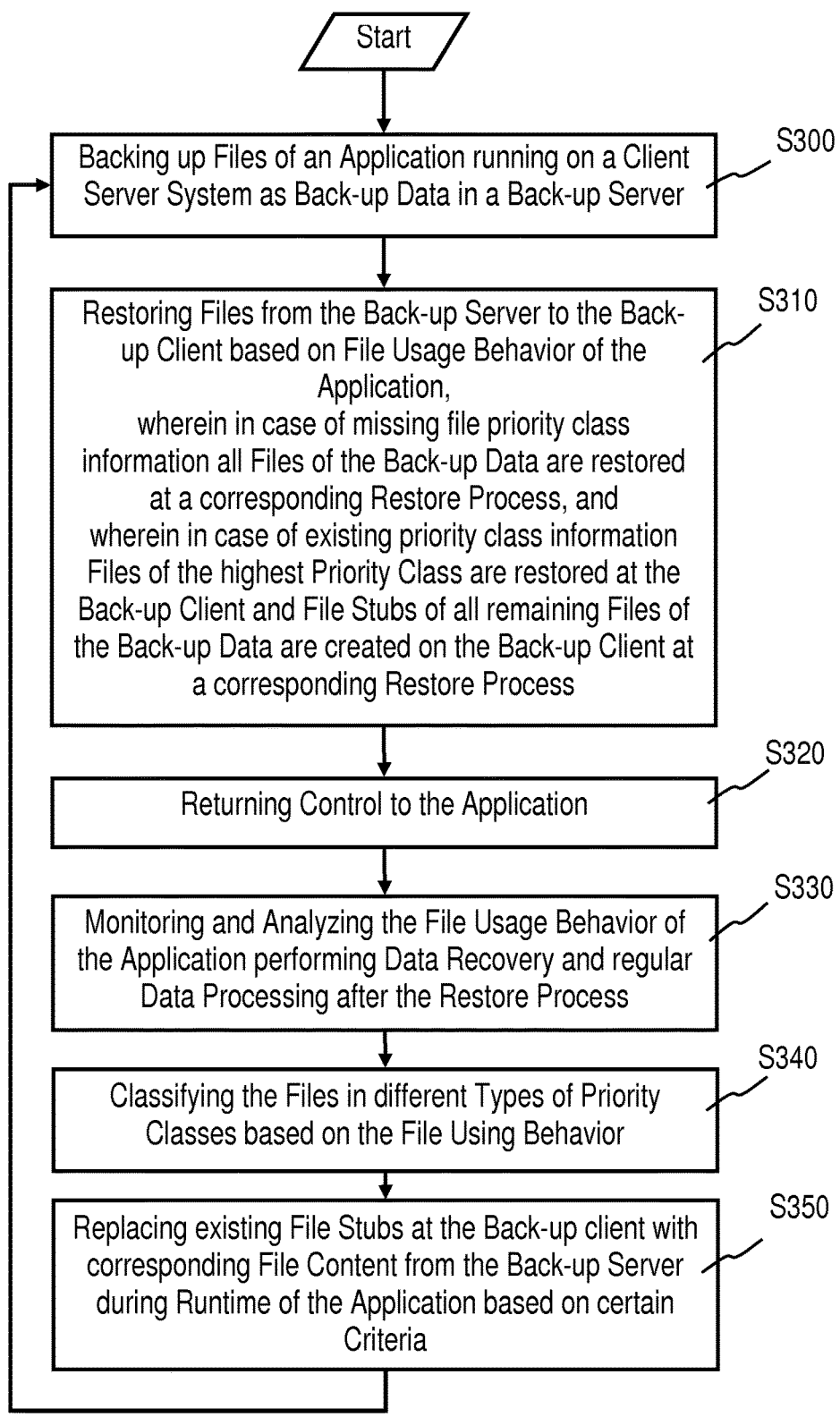
FIG. 2 is a schematic flow diagram of a method for file recovery, in accordance with an embodiment of the present invention.
Figure 3:
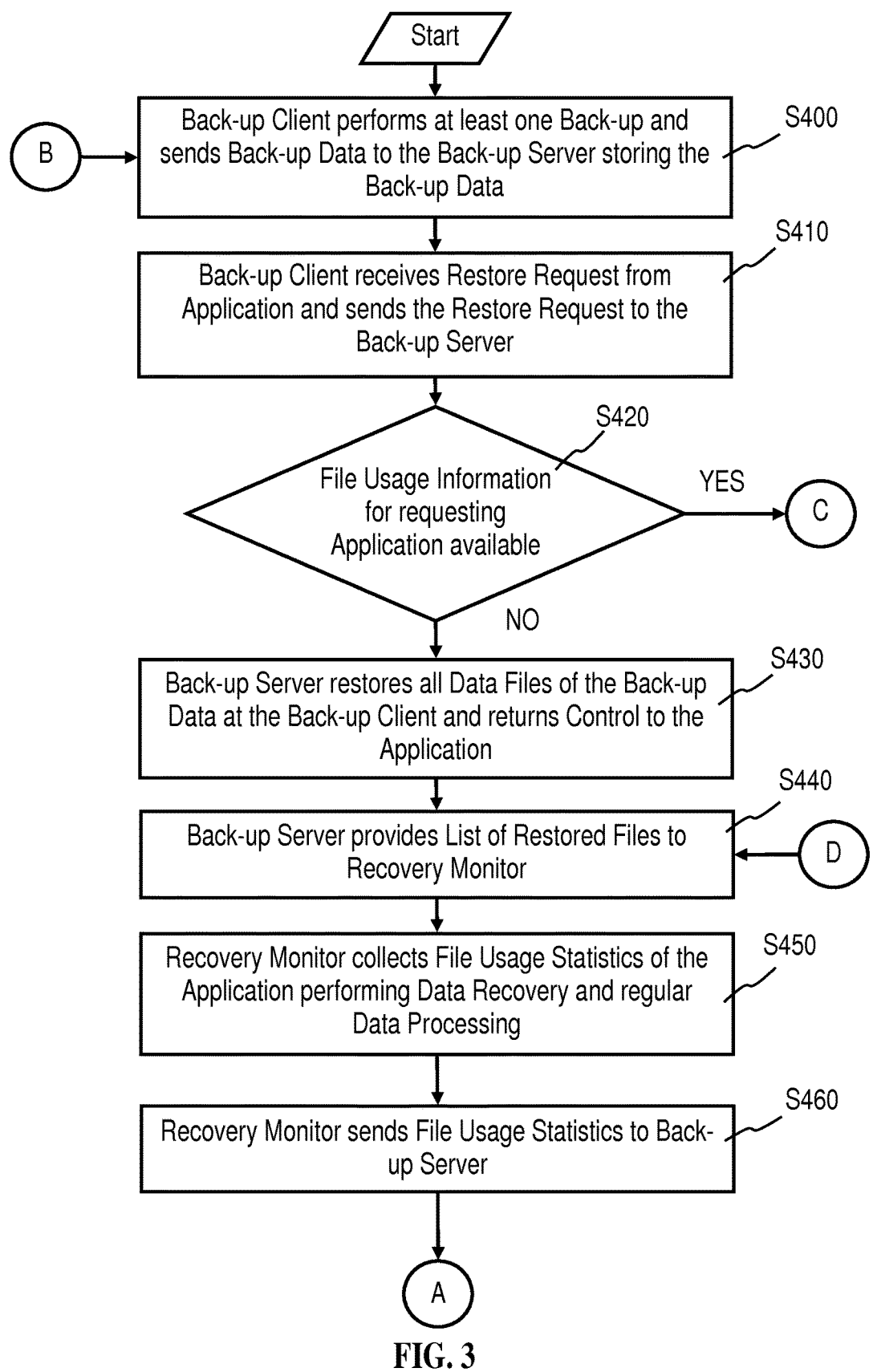
FIGS. 3 to 5 is a more detailed schematic flow diagram of the method for file recovery of FIG. 2, in accordance with an embodiment of the present invention.
Figure 4:
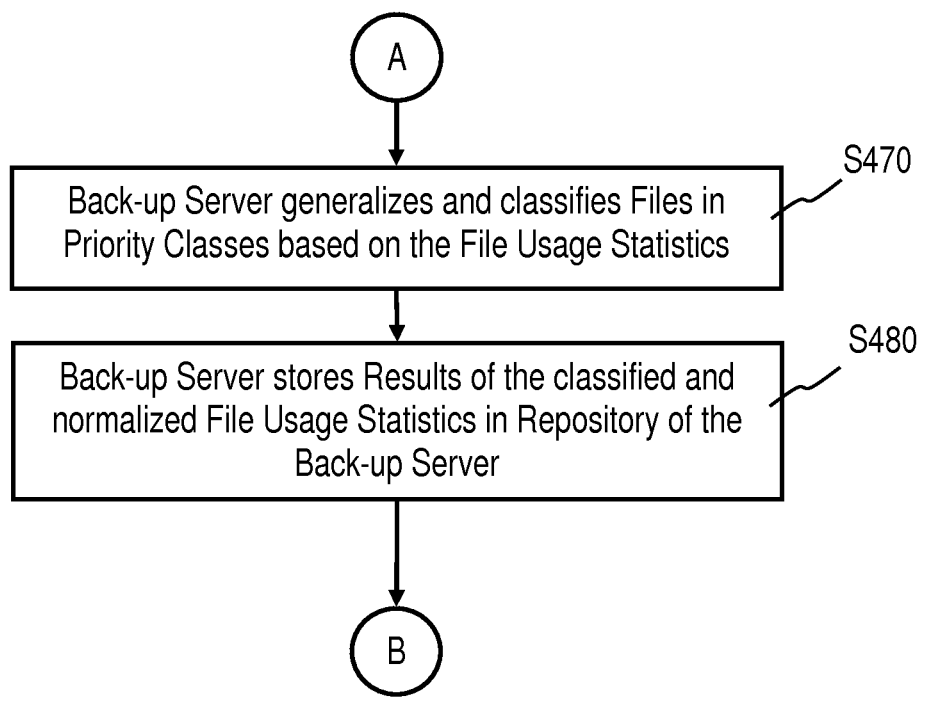
Figure 5:
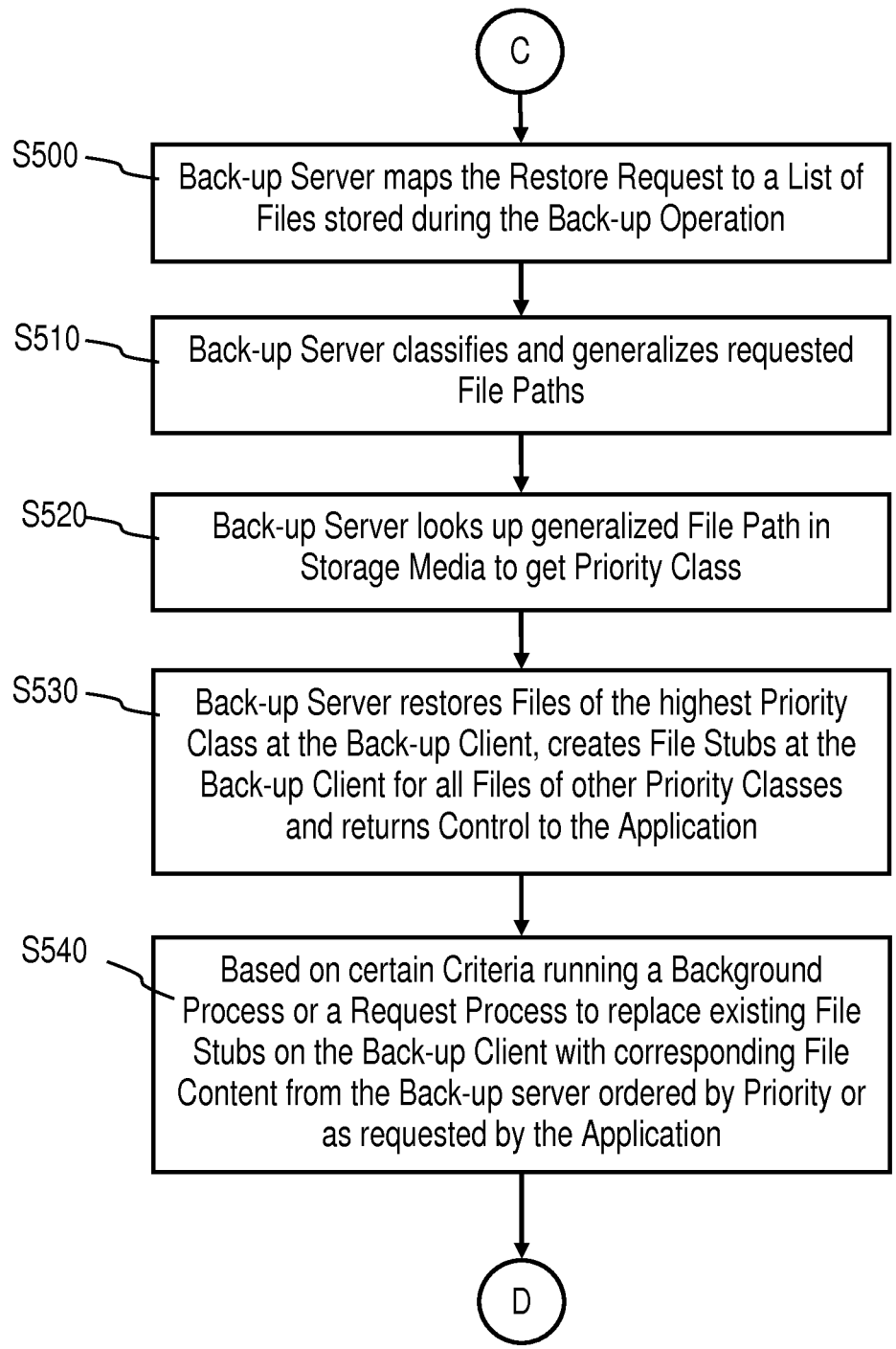

FIG. 1 shows a client server system, in accordance with an embodiment of the present invention; and FIG. 2 shows a method for file recovery, in accordance with an embodiment of the present invention; and FIGS. 3 to 5 show a more detailed flow diagram of the method for file recovery of FIG. 2, in accordance with an embodiment of the present invention.

Referring to FIG. 1, the shown embodiment of the present invention employs a client server system 1 comprising a client 100 with a client back-up tool 110 and a server 200 with a server back-up tool 210 performing file recovery. The files are generated by an application 5 running on the client server system 1. The back-up client 110 is backing up files of the application 5 as back-up data in the back-up server 210. The back-up server 210 restores files of the back-up data at the back-up client 110 based on file usage behavior of the application 5. In case of missing file priority class information the back-up server 210 restores all files of the back-up data at the back-up client 110 during a corresponding restore process. In case of existing file priority class information the back-up server 210 restores files of a highest priority class at the back-up client 110 and creates file stubs of all remaining files of the back-up data on the back-up client 110 during a corresponding restore process. The back-up server 210 returns control to the application 5, wherein the back-up client 110 and the back-up server 210 monitor and analyze the file usage behavior of the application 5 performing data recovery and regular data processing after a restore process. The back-up server 210 classifies the files in different types of priority classes based on the file usage behavior, and replaces existing file stubs at the back-up client 110 with corresponding file content during runtime of the application 5 based on certain criteria. The certain criteria may correspond to the file recovery strategy, for example.

Still referring to FIG. 1, a recovery monitor 130 of the client 100 receives a list of restored files from the back-up server 210 and collects file statistics like access times, access types, and/or performed operations like read, write, create, delete by monitoring the application 5 performing data recovery and regular data processing after the first restore process. An extension 220 of the server receives the file statistics from the recovery monitor 130.

The backup tool 110 of the client 100 is extended with an application specific extension 120. This extension performs the following tasks: Sending an application profile to the back-up tool 210 of the server 200, e.g. SID and type of restore operation. Sending file paths to be restored to the back-up tool 210 of the server 200. The send file paths are free of installation characteristics, e.g. free of SID and using relative file paths. So a second application instance of the same type can profit of monitoring data of other application instances.

Another possible extension is a "cut off time" representing a certain time frame for monitoring the file statistics by the recovery monitor 130, wherein the monitoring is stopped after reaching the "cut off time". Further the back-up operation is optimized in a way, that if files are never touched after a restore process these files are candidates to be omitted from the back-up process. Further the restore process may be separated in stages that are generated by file statistics.

Referring to FIG. 2, the shown embodiment of the present invention employs a method for file recovery, wherein files are generated by an application 5 running on a client server system 1 comprising a client 100 with a client back-up tool 110 and a server 200 with a server back-up tool 210. The method comprises the steps of: Backing up files of the application 5 as back-up data in the back-up server 200 in step S300. Restoring files from the back-up server 200 to the back-up client 100 based on file usage behavior of the application 5 in step S310, wherein in case of missing file priority class information all files of the back-up data are restored during a corresponding restore process; and wherein in case of existing file priority class information files of a highest priority class are restored at the back-up client 100 and file stubs of all remaining files of the back-up data are created on said back-up client 100 during a corresponding restore process. In step S320 the control is returned to the application 5. In step S330 file usage behavior of the application 5 performing data recovery and regular data processing after the restore process is monitored and analyzed. In step S340 the files are classified in different types of priority classes based on the file usage behavior, and in step S350 existing file stubs are replaced at the back-up client 100 with corresponding file content from the back-up server 200 during runtime of the application 5 based on certain criteria. The certain criteria may correspond to the file recovery strategy, for example.

Referring to FIGS. 3 to 5, the embodiment of the method for file recovery of FIG. 2 is explained in greater detail. In step S400 the back-up tool 110 of the client 100 performs at least one back-up and sends back-up data to the back-up tool 210 of the server 200 storing the back-up data at the repository 230. Application 5 are typically backed up repeatedly, e.g., daily. The back-up data are stored and may be deleted after a certain time, e.g. a company always has backups for each of the last seven days available, older backups are deleted. To demonstrate the present invention an example database application with an instance ID "AB3" is used. For any reason, e.g. a disaster or a planned event, the application's data may need to be restored, so in step S410 the client back-up tool 110 receives a restore request from the application 5 and sends the restore request to the server back-up tool 210. In step S420 the server back-up tool 210 looks for file usage information of the requesting application 5. If no file usage information is available, a regular restore process known from the state of the art is performed in step S430. The client back-up tool 110 gives at least a name of application, name of instance, and backup identification (ID) as back-up request information to the server back-up tool 210. With this information given, the server back-up tool 210 looks up the backed up data in the repository 230 of the back-up server 200. Afterwards, all files of the back-up data are being sent to the back-up client 100, i.e. restored, and the file recovery process continues with step S440. Further in step S430, the server back-up tool 210 returns control to the application 5 which continues its work with the newly restored data, e.g., for most database applications the first phase typically consists of a data recovery, where all the data files, which have been restored, are analyzed and prepared. If there are already file usage information available, for example, from former performed file recovery processes or from other instances of the same application 5, then the restore process can be optimized and the file recovery process is continued with step S500 shown in FIG. 5.

In step S440 the server back-up tool 210 provides a list of all restored files to the recovery monitor 130 of the client 100. This way the recovery monitor 130 knows which files need to be monitored in the following monitoring procedure. In step S450 file usage statistics are collected on the client 100 by the recovery monitor 130 while the application 5 is running. The file usage statistics comprises at least one of the following information: Time of file access, type of file access, number of file accesses. From the beginning of the data recovery of the application 5 the recovery monitor 130 monitors all restored files, i.e. the recovery monitor 130 tracks which file has been accessed when, for example, relative to a restore time, and what kind of access type was used. In the shown embodiment the first access-time and access-type is relevant. An example file usage statistics entry is shown in Table 1.

TABLE 1

| App-Name | Instance-Name | Pathname | Time | Type |
| --- | --- | --- | --- | --- |
| DB2 | AB3 | /db2/AB3/datal | 00:00:26 | read |

The recovery monitor 130 may perform the monitoring and analyzing of the file usage behavior continuously or for a certain time period. Further the monitoring and analyzing may be stopped for all files that have been accessed a given number of accesses. In one embodiment of the invention, the recovery monitor 130 may stop monitoring all files that have been accessed already once so that the performance of the file system is influenced less by the monitoring process.

Also, these file usage statistics are sent to the server back-up tool 210 and processed. In step S460, the recovery monitor 130 sends the file usage statistics to the server back-up tool 210. In one embodiment of the invention the file usage statistics are sent periodically and monitoring never stops, except if a new restore is started, then monitoring will start from beginning. In another embodiment the file usage statistics are sent only once and afterwards monitoring is stopped on the client side so that no further statistics will be collected.

In step S470, the server back-up tool 210 generalizes and classifies the files based on the file usage statistics. If the server back-up tool 210 receives file usage statistics from a specific application instance, it will first generalize the statistics so that their "classification", e.g. what files should be restored first for this application 5, can also be used for other instances of the same application 5. Therefore, the server back-up tool 210 replaces all instance-specific information by generic placeholders. For example the entry of Table 1 will be converted to the entry shown in Table 2:

TABLE 2

| App-Name | Pathname | Time | Type |
| --- | --- | --- | --- |
| DB2 | [application-root]/[instance-name]/datal | 00:00:26 | read |

After all statistics have been generalized all files are grouped in priority classes based on first access-time and access-type. In order to do so, known mathematical-statistical approaches, such as clustering, will be applied on the entries. An important dimension of the entries is the first access-time of the files. However, the first access-type is also important, especially, but not only, for files that are deleted at first. The conclusion, which the logic of the server back-up tool 210 produces for such files, is that they do not need to be restored at all. Files with other access types imply other conclusions.

The restore strategy is based upon statistics on block level while considering file level relations. For the classification a first access time, an access type and/or optionally the number of accesses and their type within a certain time frame on a block level granularity is used, for example.

Further the following access types to blocks and the corresponding conclusion for optimizing the restore are considered. If the access type is a create access, no restore operation is performed, since this block is not part of restore process and its previous back-up process but is created afterwards. If the access type is a read access and a block is read after restore, its priority is increased depending on how early and how often the block is read. If the access type is a write access, no restore operation is performed, since the content of this block is newly written and thus its old content is not important. If the access type is a delete access, no restore operation is performed, since the block is deleted after it is restored.

With this restore strategy the restore process on file level which corresponds to the application perspective is improved. For example, in case most blocks of a file are read, the blocks that were read during the last recovery will be restored. The priority of each block is based on the classification based on the file usage statistics as described above. That allows for the application 5 to access blocks needed in early stages of the recovery locally since they are the first ones that are restored. Example entries are shown in Table 3.

TABLE 3

| App-Name | Pathname | Time | Type | Prio |
|---|---|---|---|---|
| DB2 | [application-root]/[instance-name]/data1 | 00:00:26 | read | 1 |
| DB2 | [application-root]/[instance-name]/data3 | 00:00:28 | read | 1 |
| DB2 | [application-root]/[instance-name]/traces | 00:00:05 | delete | 0 |
| DB2 | [application-root]/[instance-name]/log | 00:01:02 | read | 2 |

Whereas "Prio 1" denotes the highest priority-class, i.e., these files are restored at first, "Prio 0" denotes the lowest priority-class, i.e., these files are not restored at all, and "Prio 2" and increasing numbers denote lower priority-classes, the greater the number the lower its priority-class, except for 0.

In case a first couple of blocks of a file are not read and only new blocks are appended to the file, no part of the file is restored which is optimal in terms of performance. In case only a few defined blocks are read by each application recovery (e.g. the first blocks of a file, which could be a header), only those blocks will be restored. In case most blocks of a file are written, no blocks are restored that are not read before they are overwritten. Thus in this case most parts of the file are not restored. In case of a mixture of read accesses and write accesses, so that there are block access patterns within the application recovery that are valid for each recovery even this access type is optimized, only the read blocks are restored, the blocks that are overwritten only, will not be restored. If a ratio of read and write blocks exceeds a certain threshold, all blocks of that particular file will be restored. This is to improve the recovery time objective by comparing overhead of on-demand access that may occur, if a file is heavily used. In case a file is deleted, no block of the file is restored. The results of these steps are file usage statistics entries grouped by priority class, shown in Table 3, for example.

Finally, the results of the generalized and classified file usage statistics are stored in the repository 230 of the back-up server 200 indexed by generalized file paths in step S480.

After all files of the back-up data have been restored to the client 100 during a first restore process without file usage information, the application will start its recovery and afterwards regular processing. For example, a database would require a database recovery where the data is analyzed and preprocessed, before the database can be used by other applications.

In a typical application 5 and data protection lifecycle, backups occur regularly and often. Thus, it is likely that after an application 5 has been restored, there will be further backups as described above. At some point in time, there may be another reason why a restore of one of such back-up processes is necessary.

As described above, for every restore process the server back-up tool 210 first checks in step S420 whether there is already file usage information available. This also involves using generalized statistics from other instances. If there are already file usage information available the restore process can be optimized and the file recovery process is continued with step S500 shown in FIG. 5. In step S500 the back-up server 200 maps the restore request from the client back-up tool 110 to a list of files stored during the back-up operation. These file paths are not yet generalized and just represent the concrete full qualified file paths of the application instance.

With the list of full qualified file paths, the given application name and instance name the server back-up tool 210 is able to classify and generalize the file paths in step S510. The server back-up tool 210 uses the same algorithm as described in step S470 of the process flow. At the end the server back-up tool 210 processes a list of generalized file paths. An exemplary list of generalized file paths is shown in Table 4, for example.

TABLE 4

| Pathname |
|---|
| [application-root]/[instance-name]/data1 |
| [application-root]/[instance-name]/data3 |
| [application-root]/[instance-name]/traces |
| [application-root]/[instance-name]/log |

With the list of normalized file paths and the application name the server back-up tool 210 is now able to lookup the normalized file paths in the table created for this concrete application 5. So in step S520 the server back-up tool 210 looks up normalized file paths in the repository 230 to get the priority class. As mentioned earlier the application name was provided to the server back-up tool 210, thus the server back-up tool 210 is able to directly look up the entries in Table 3 created and stored in earlier process steps S470 and S480. Based on the file usage statistics the server back-up tool 210 is able to get the priority class for each file that is used as part of the application restore process.

In step S530, the server back-up tool 210 restores the files that were determined to belong to the highest priority class to the client 100. Typically these files are the ones that are needed at the very beginning of an application recovery. They were given this high priority class because of the fact that they were accessed very early in a past application recovery of this or another application instance of the same application type. For files of all other priority classes except of priority class 1, so called file stubs are created on the client side in step S530. These file stubs only contain metadata as for example the file name, permissions, ownership etc. but not the file content itself. Thus the restore of these file stubs only transfers very few data to the client 100, the main portion representing the file content remains on the repository 230 of the back-up server 200. After all file stubs are created and the files of the highest priority class are restored at the client 100, the server back-up tool 210 returns the control to the application 5. That means the restore operation is declared complete to the application 5. This will allow for an application recovery and startup at this early stage of the restore process. If the application recovery and start up accesses files of the highest priority class, these files can be directly accessed from the local disc. It is assumed that multiple application recoveries require the same file access patterns. All files of other priority classes can also be accessed by the application 5 since the file stubs are already copied on the client 100. In case such a file stub is supposed to be read the file content is loaded from the back-up server 200 as response to the read/write request on the file stub.

Since the control was already returned to the application the following restore tasks will be processed in the background. The server back-up tool 210 will continue to transfer file content to the client 100 ordered by the determined priority classes using a background process. That means over time the file stubs will be filled with the file content. At first priority class "Prio 2", then priority class "Prio 3" and so on until only files of priority class "Prio 0" are left. Those files are not restored at all since usage statistics show they were not needed by the application 5 in the past. Again, the file stubs are already there. If the application 5 tries to access those files they are transferred to the client 100 on demand using a request process.

Presented herein is an improved method for file recovery, wherein files are generated by an application 5 running on a client server system 1 comprising a client 100 with a client back-up tool 110 and a server 200 with a server back-up tool 210, comprising the steps of: Backing up files of the application 5 as back-up data in the back-up server 200; restoring files from the back-up server 200 to the back-up client 100 based on file usage behavior of the application 5; wherein in case of missing file priority class information all files of the back-up data are restored during a corresponding restore process; wherein in case of existing file priority class information files of a highest priority class are restored at the back-up client 100 and file stubs of all remaining files of the back-up data are created on said back-up client 100 during a corresponding restore process; returning control to the application 5; monitoring and analyzing the file usage behavior of said application 5 performing data recovery and regular data processing after the restore process; classifying the files in different types of priority classes based on the file usage behavior, and replacing existing file stubs at the back-up client 100 with corresponding file content from said back-up server 200 during runtime of the application 5 based on certain criteria.

The technical problem underlying the present invention is to provide a method for file recovery and a corresponding client server system, which are able to optimize recovery process of files and to solve the above mentioned shortcomings and pain points of prior art file recovery in a client server system.

Accordingly, in an embodiment of the present invention a method for file recovery, wherein files are generated by an application running on a client server system comprising a client with a client back-up tool and a server with a server back-up tool, comprises the steps of: Backing up files of the application as back-up data in the back-up server; restoring files from the back-up server to the back-up client based on file usage behavior of the application; wherein in case of missing file priority class information all files of the back-up data are restored during a corresponding restore process; and wherein in case of existing file priority class information files of a highest priority class are restored at the back-up client and file stubs of all remaining files of the back-up data are created on the back-up client during a corresponding restore process; returning control to the application; monitoring and analyzing the file usage behavior of the application performing data recovery and regular data processing after the restore process; classifying the files in different types of priority classes based on the file usage behavior, and replacing existing file stubs at the back-up client with corresponding file content from the back-up server during runtime of the application based on certain criteria.

In further embodiments of the present invention, based on the certain criteria a background process replaces existing file stubs on the back-up client with corresponding file content from the back-up server ordered by priority or a request process replaces existing file stubs on the back-up client with corresponding file content from the back-up server as requested by the application.

In further embodiments of the present invention, during monitoring and analyzing the file usage behavior is determined by collecting file usage statistics of the application based on a list of restored files.

In further embodiments of the present invention, the file usage statistics comprise at least one of the following information: time of file access, type of file access, number of file accesses.

In further embodiments of the present invention, the files of the application are generalized and classified based on the file usage statistics.

In further embodiments of the present invention, classification results of the files are stored in a repository of the back-up server indexed by generalized file paths.

In further embodiments of the present invention, requested file paths of a restore process are generalized and looked up in the repository to determine a corresponding priority class of corresponding files.

In further embodiments of the present invention, monitoring and analyzing of the file usage behavior is performed continuously or for a certain time period.

In further embodiments of the present invention, monitoring and analyzing is stopped for all files that have been accessed a given number of accesses.

In another embodiment of the present invention, a client server system comprises a back-up tool implemented in a back-up client and a back-up server performing file recovery, wherein the files are generated by an application running on the client server system. The back-up client is backing up files of the application as back-up data in the back-up server. The back-up server restores files of the back-up data at the back-up client based on file usage behavior of the application; wherein in case of missing file priority class information the back-up server restores all files of the back-up data at the back-up client during a corresponding restore process; and wherein in case of existing file priority class information the back-up server restores files of a highest priority class at the back-up client and creates file stubs of all remaining files of the back-up data on the back-up client during a corresponding restore process. Then the back-up server returns control to the application; wherein the back-up client and the back-up server monitor and analyze the file usage behavior of the application performing data recovery and regular data processing after a restore process. The back-up server classifies the files in different types of priority classes based on the file usage behavior, and replaces existing file stubs at the back-up client with corresponding file content during runtime of the application based on certain criteria.

In further embodiments of the present invention, based on the certain criteria the back-up server runs a background process to replace existing file stubs on the back-up client with corresponding file content from the back-up server ordered by priority or the back-up client runs a request process to replace existing file stubs on the back-up client with corresponding file content from the back-up server as requested by the application.

In further embodiments of the present invention, the back-up server provides a list of restored files of the application to a recovery monitor which collects file usage statistics based on the list of restored files.

In further embodiments of the present invention, the back-up server classifies and generalizes the files of the application based on the file usage statistics and stores the classification result in a repository indexed by generalized file paths; wherein the back-up server generalizes requested file paths of a restore process and looks them up in the repository to determine a corresponding priority class of the files.

In another embodiment of the present invention, a data processing program for execution in a data processing system comprises software code portions for performing a method for file recovery when the program is run on the data processing system.

In yet another embodiment of the present invention, a computer program product stored on a computer-usable medium, comprises computer-readable program means for causing a computer to perform a method for file recovery when the program is run on the computer.

All in all, embodiments of the present invention introduce a method for optimized recovery of files, wherein files are backed up in a back-up server and restored to a client.

In summary, to improve the short comings and problems of prior art solutions outlined in the background section embodiments of the present invention introduce an optimized restore workflow so that a corresponding application can recover before completion of the restore process.

Embodiments of the present invention restore files based on certain criteria like a category of the files. Therefore critical files are restored first and less critical files are restored in the background but available from the beginning through file stubs. Unnecessary files are left on the back-up server but also available as file stubs.

Advantageously in embodiments of the present invention applications can start their recovery processes before all files of the back-up data are restored at the back-up client. Learning of file classification is based on application profiles and historical file statistics. So a better recovery time objective is possible through file usage prediction and corresponding restore strategy. Also embodiments of the present invention offer cost efficient alternatives to enterprise storage snapshot technologies.

The key difference compared to state of the art file recovery embodiments is, that embodiments of the present invention gather file usage statistics after a restore operation. The basic idea of collecting usage statistics on file level and to group files based on their usage is state of the art. The disadvantage of that state of the art approach is that the classification of files will represent general access patterns of the application to its files. Application restore operations and the subsequent recovery process are usually rarely executed. Thus the access patterns for the application recovery will hardly be covered within the collected usage statistics.

In comparison to that, embodiments of the present invention collect file usage statistics basically after a restore process has been finished or in certain time frames after such restore processes. The main advantage of this approach is that the usage statistics of embodiments of the present invention only represent the access patterns of the application to its files during the corresponding recovery process. This allows optimizing subsequent application recovery processes since there are similarities between the access patterns of the recovery processes of the same application.

Further embodiments of the present invention have application-awareness. Thus, after a restore and initial application recovery has happened, the file and block usage statistics collected on the client side are cleaned up from instance specific information. For example, in a database a corresponding recovery behavior, i.e., which files are when and how accessed after a restore, is likely to be similar on multiple systems and different instances. For example the recovery of the database always accesses configuration files at first and then data files. So embodiments of the present invention generalize instance specific entries in universal entries. All statistic entries are generalized in this way. When it comes to a restore for another machine/instance, the universal path is filled up with instance specific data. Alternatively instance specific data of the recovering machine/instance is generalized and compared with the universal path. Thus, the learned priority and classification of which files need to be restored when, can also be used if a different machine with a different instance needs to restore and recovery its database instance.

In further embodiments of the present invention, the generalization does not only include the knowledge of applications but also of different back-up and restore types of such applications, so that the recovery time objective can be improved even more.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for file recovery of files that are generated by an application running on a client-server system comprising a back-up client with a client back-up tool and a back-up server with a server back-up tool, wherein the method comprises:

backing up, by one or more processors, the files of the application as back-up data in the back-up server;

restoring, by the one or more processors, the files from the back-up server to the back-up client based on file usage behavior of the application, wherein in response to the files of the back-up data missing file priority class information, restoring, by the one or more processors, all of the files during a restore process;

in response to the files of the back-up data having the file priority class information:

prioritizing, by the one or more processors, the files according to the file priority class information;

restoring, by the one or more processors, files of a highest priority class at the back-up client and creating file stubs of all remaining files of the back-up data on the back-up client during the restore process, wherein the all remaining files are below the highest priority class, wherein the file stubs do not contain file content;

monitoring and analyzing, by the one or more processors, the file usage behavior of the application performing data recovery and regular data processing after the restore process;

classifying, by the one or more processors, the restored files in different types of priority classes based on the file usage behavior, and replacing, by the one or more processors, existing file stubs at the back-up client with corresponding file content from the back-up server during runtime of the application based on predetermined criteria.

2. The method according to claim 1, wherein the replacing further comprises:

replacing, by the one or more processors executing a background process and based on the predetermined criteria, the existing file stubs on the back-up client with the corresponding file content from the back-up server ordered by priority.

3. The method according to claim 1, wherein the replacing further comprises:

replacing, by the one or more processors, the existing file stubs on the back-up client with the corresponding file content from the back-up server as requested by the application.

4. The method according to claim 1, wherein during the monitoring and analyzing, the file usage behavior is determined by collecting file usage statistics of the application based on a list of the restored files.

5. The method according to claim 4, wherein the file usage statistics comprises at least one of time of file access, type of file access, and number of file accesses.

6. The method according to claim 4, wherein the files of the application are generalized and classified based on the file usage statistics.

7. The method according to claim 6, wherein classification results of the files are stored in a repository of the back-up server indexed by generalized file paths.

8. The method according to claim 7, wherein requested file paths of the restore process are generalized and looked up in the repository to determine a corresponding priority class of files corresponding to the requested file paths.

9. The method according to claim 1, wherein the monitoring and analyzing of the file usage behavior is performed continuously.

10. The method according to claim 1, wherein the monitoring and analyzing of the file usage behavior is performed for a certain time period.

11. The method according to claim 1, wherein the monitoring and analyzing is stopped for all files that have been accessed a predetermined number of times.

12. A client-server system comprising:

a back-up client, implemented at least partially by hardware, wherein the back-up client comprises a client back-up tool; and a back-up server, implemented at least partially by hardware, wherein the back-up server comprises a server back-up tool performing file recovery, and wherein the files to be backed up are generated by an application running on the client-server system;

wherein the back-up client is backing up the files of the application as back-up data in the back-up server;

the back-up server restores the files of the back-up data at the back-up client based on file usage behavior of the application; wherein in case of missing file priority class information associated with the back-up data, the back-up server restores all of the files of the back-up data at the back-up client during a corresponding restore process; and in case of having existing file priority class information, the back-up server restores files of a highest priority class at the back-up client and creates file stubs of all remaining files of the back-up data on the back-up client during the corresponding restore process, wherein the file stubs do not contain file content;

the back-up server returns control to the application; wherein the back-up client and the back-up server monitor and analyze the file usage behavior of the application performing data recovery and regular data processing after the corresponding restore process; and wherein the back-up server classifies the restored files in different types of priority classes based on the file usage behavior, and replaces existing file stubs at the back-up client with corresponding file content during runtime of the application based on predetermined criteria.

13. The client-server system according to claim 12, wherein based on the predetermined criteria, the back-up server runs a background process to replace the existing file stubs on the back-up client with the corresponding file content from the back-up server ordered by priority.

14. The client-server system according to claim 12, wherein based on the predetermined criteria, the back-up client runs a request process to replace the existing file stubs on the back-up client with the corresponding file content from the back-up server as requested by the application.

15. The client-server system according to claim 12, wherein the back-up server provides a list of the restored files of the application to a recovery monitor, wherein the recovery monitor collects file usage statistics based on the list of the restored files.

16. The client-server system according to claim 12, wherein the back-up server classifies and generalizes the files of the application based on the file usage statistics and stores the classification result in a repository indexed by generalized file paths; and wherein the back-up server generalizes requested file paths of the corresponding restore process and looks them up in the repository to determine a corresponding priority class of the files corresponding to the requested file paths.

17. A computer program product for file recovery of files that are generated by an application running on a client-server system comprising a client with a client back-up tool and a back-up server with a server back-up tool, the computer program product comprising a computer readable storage medium having program code embodied therewith, wherein the computer readable storage medium is not a transitory signal, and wherein the program code is readable and executable by a processor to perform a method comprising:

backing up the files of the application as back-up data in the back-up server;

restoring the files from the back-up server to the back-up client based on file usage behavior of the application, wherein in response to the files of the back-up data missing file priority class information, restoring all of the files during a restore process;

in response to the files of the back-up data having the file priority class information:

prioritizing the files according to the file priority class information;

restoring files of a highest priority class at the back-up client and creating file stubs of all remaining files of the back-up data on the back-up client during the restore process, wherein all of the remaining files are below the highest priority class, wherein the file stubs do not contain file content;

monitoring and analyzing the file usage behavior of the application performing data recovery and regular data processing after the restore process;

classifying the restored files in different types of priority classes based on the file usage behavior, and replacing existing file stubs at the back-up client with corresponding file content from the back-up server during runtime of the application based on predetermined criteria.

18. The computer program product of claim 17, wherein the replacing further comprises:

replacing, based on the predetermined criteria, the existing file stubs on the back-up client with the corresponding file content from the back-up server ordered by priority.

19. The computer program product of claim 17, wherein the replacing further comprises:

replacing the existing file stubs on the back-up client with the corresponding file content from the back-up server as requested by the application.

20. The computer program product of claim 17, wherein during the monitoring and analyzing, the file usage behavior is determined by collecting file usage statistics of the application based on a list of the restored files.

* * * * *